Patented Mar. 27, 1945

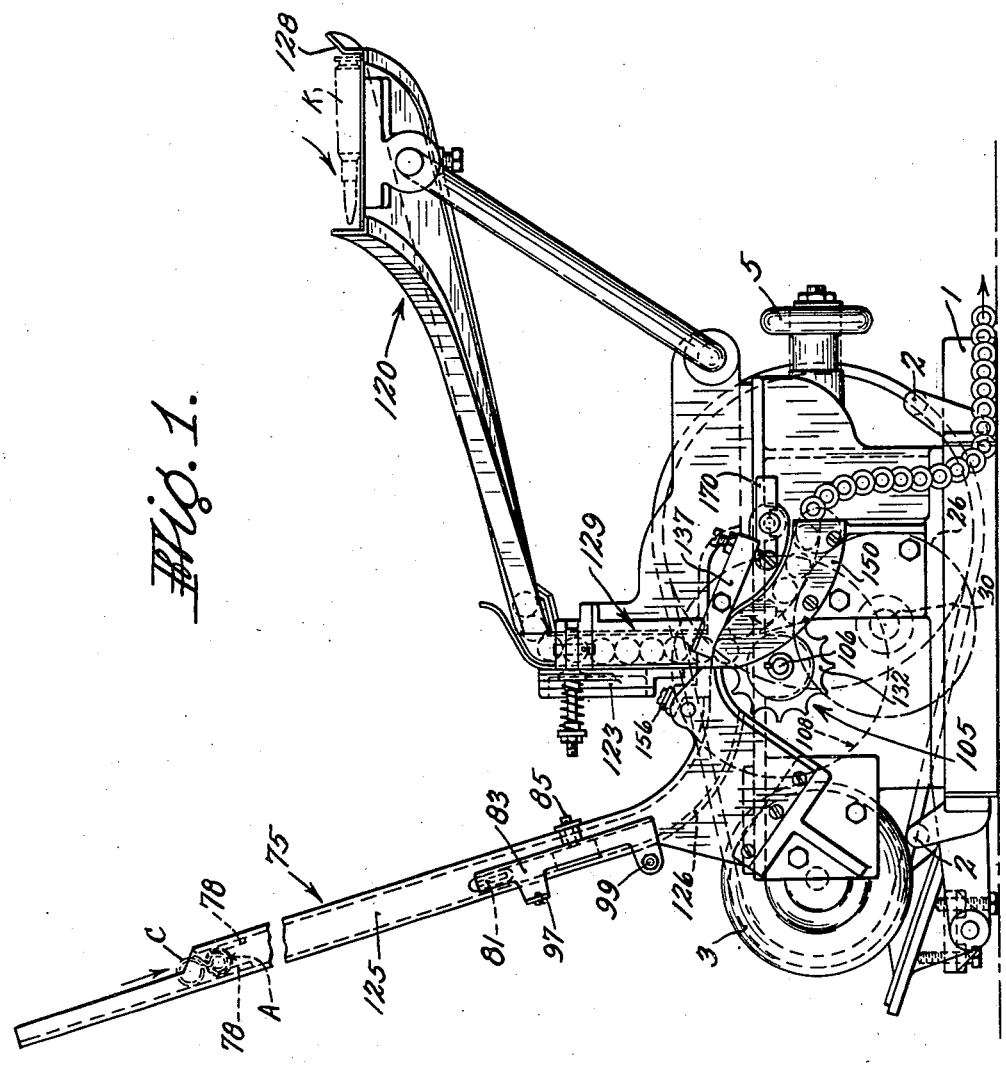

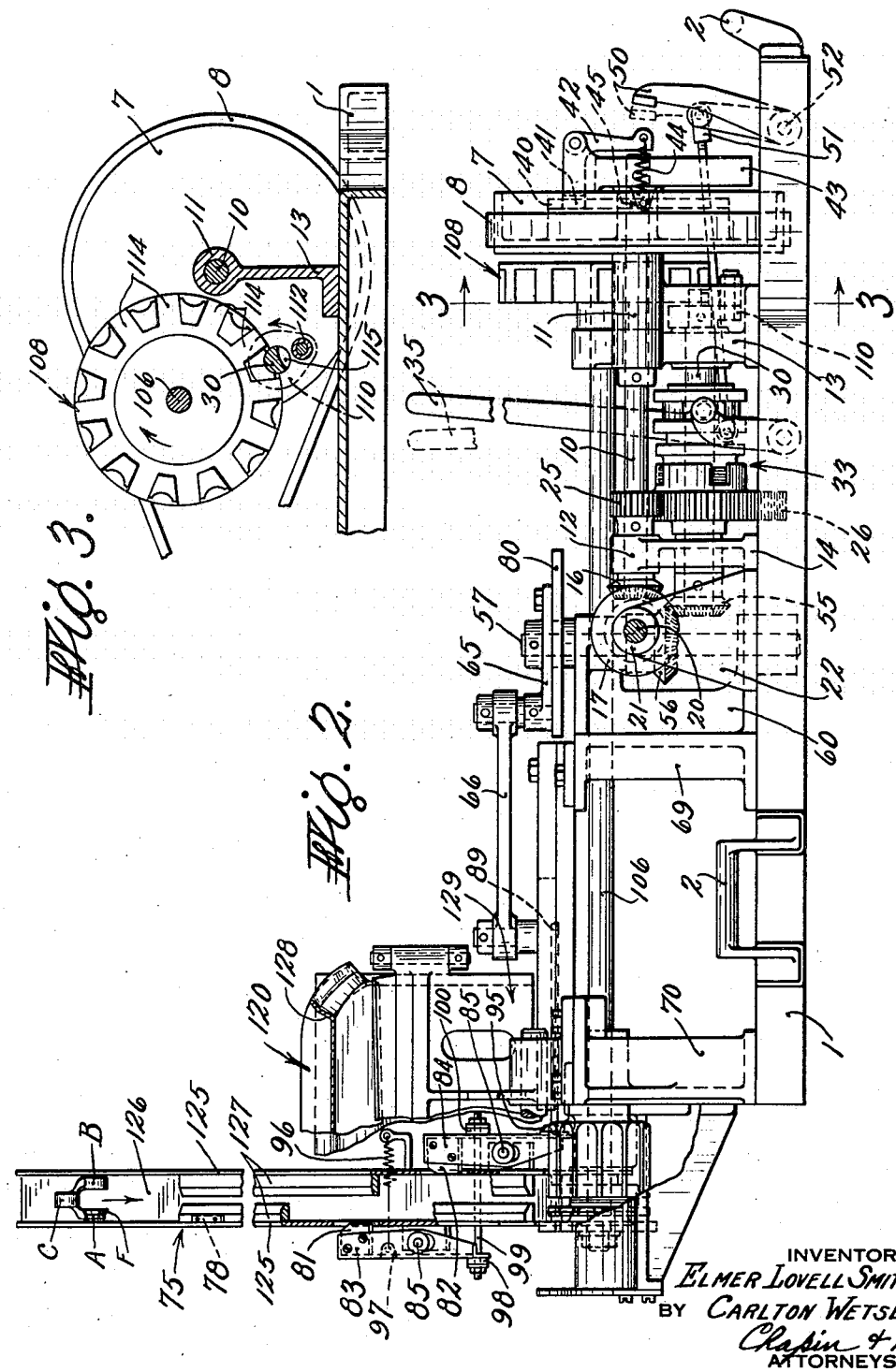

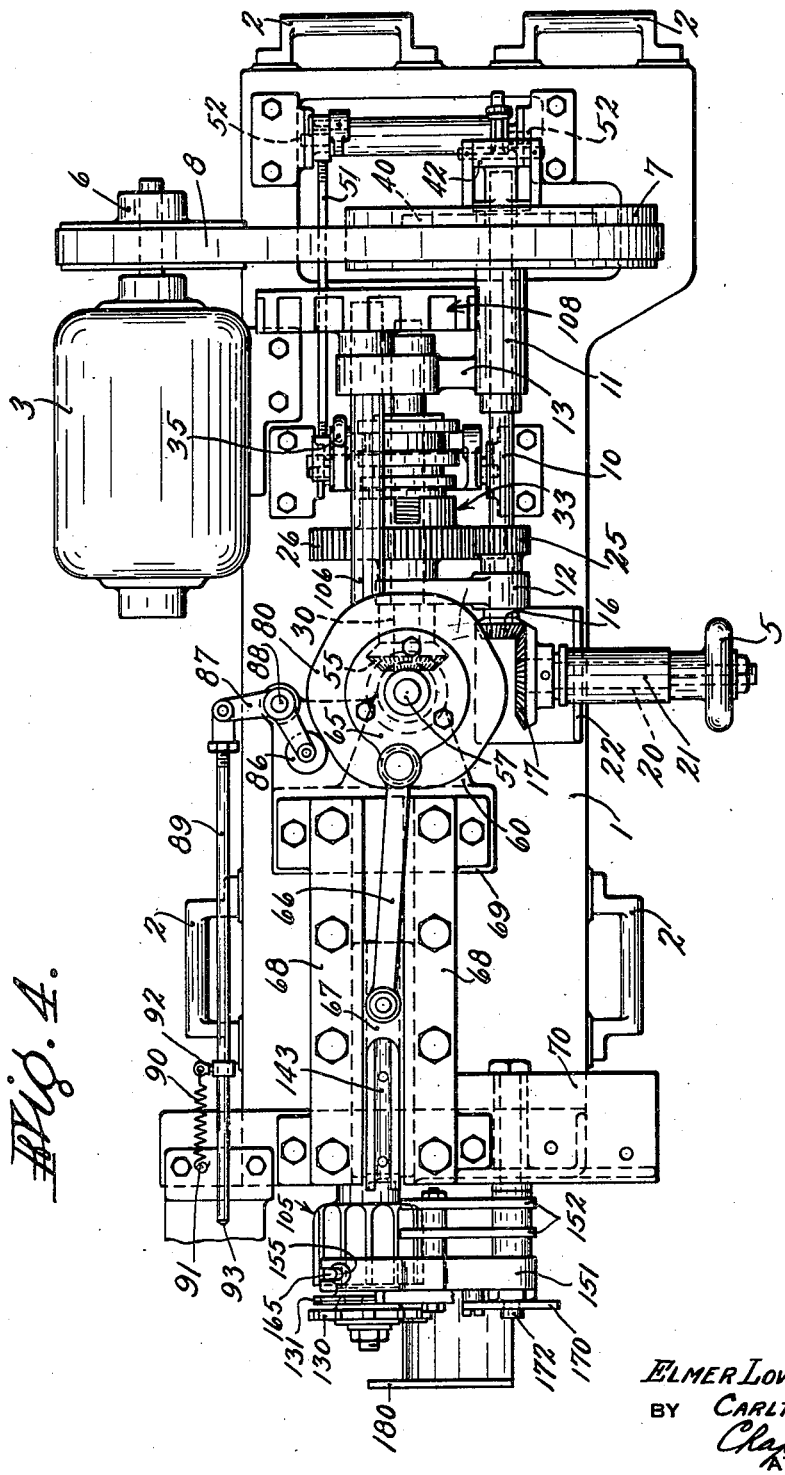

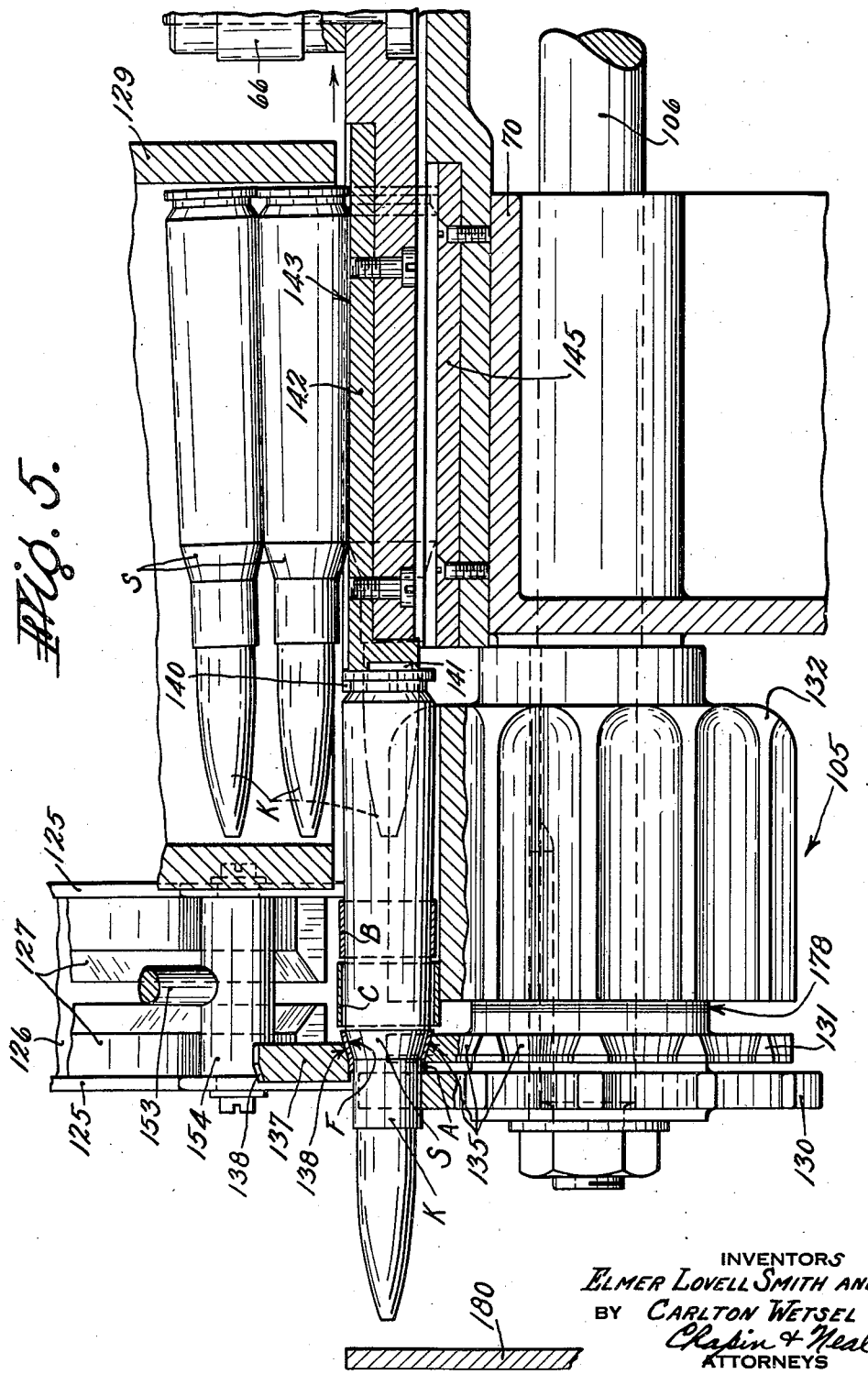
March 27, 1945. E. L. SMITH ET AL 2,372,399
LINK BELT CARTRIDGE LOADER
Filed July 24, 1943 6 Sheets-Sheet 4
INVENTORS
ELMER LOVELL SMITH AND
BY CARLTON WETSEL
Chapin & Neal
ATTORNEYS

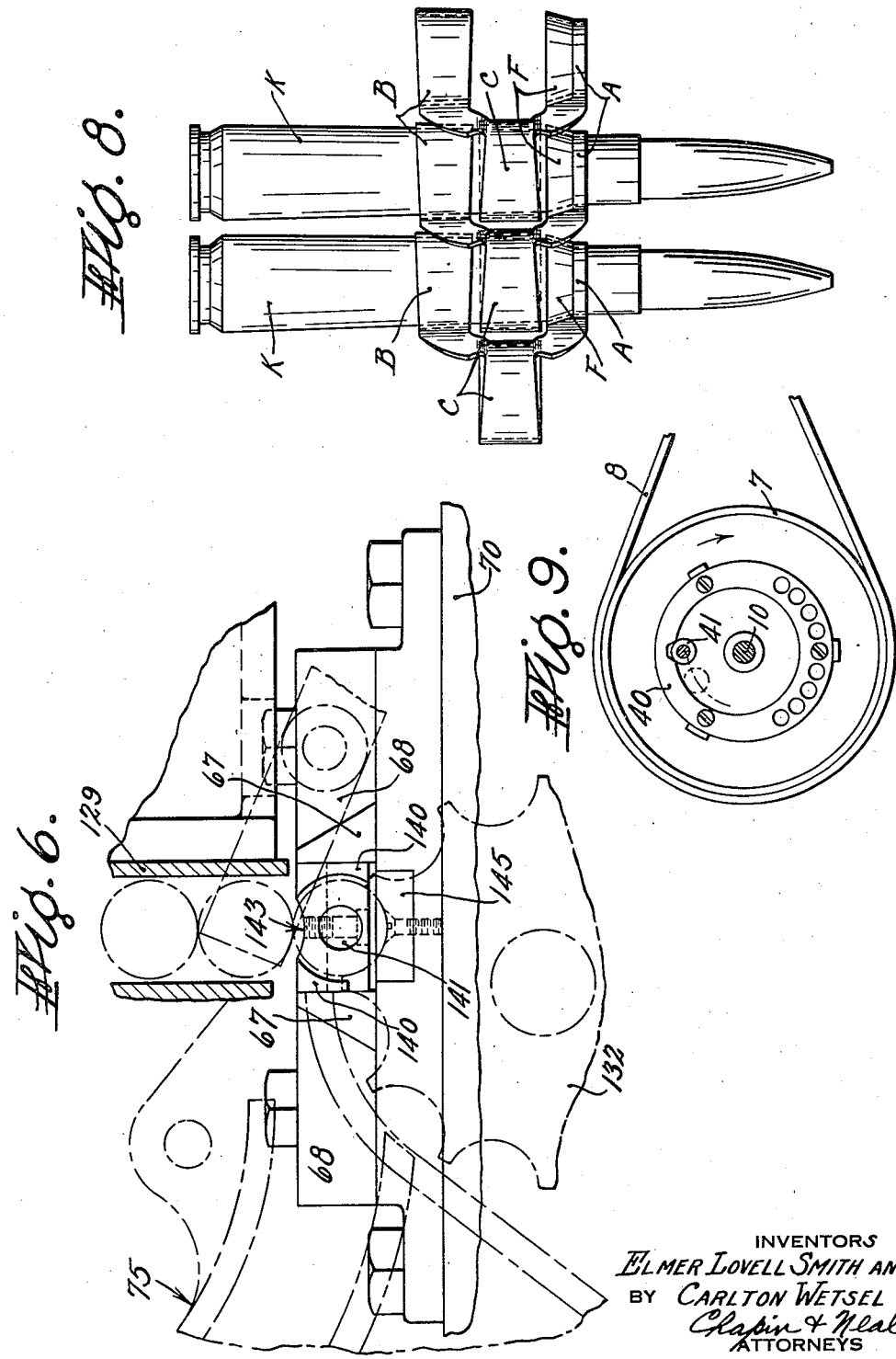

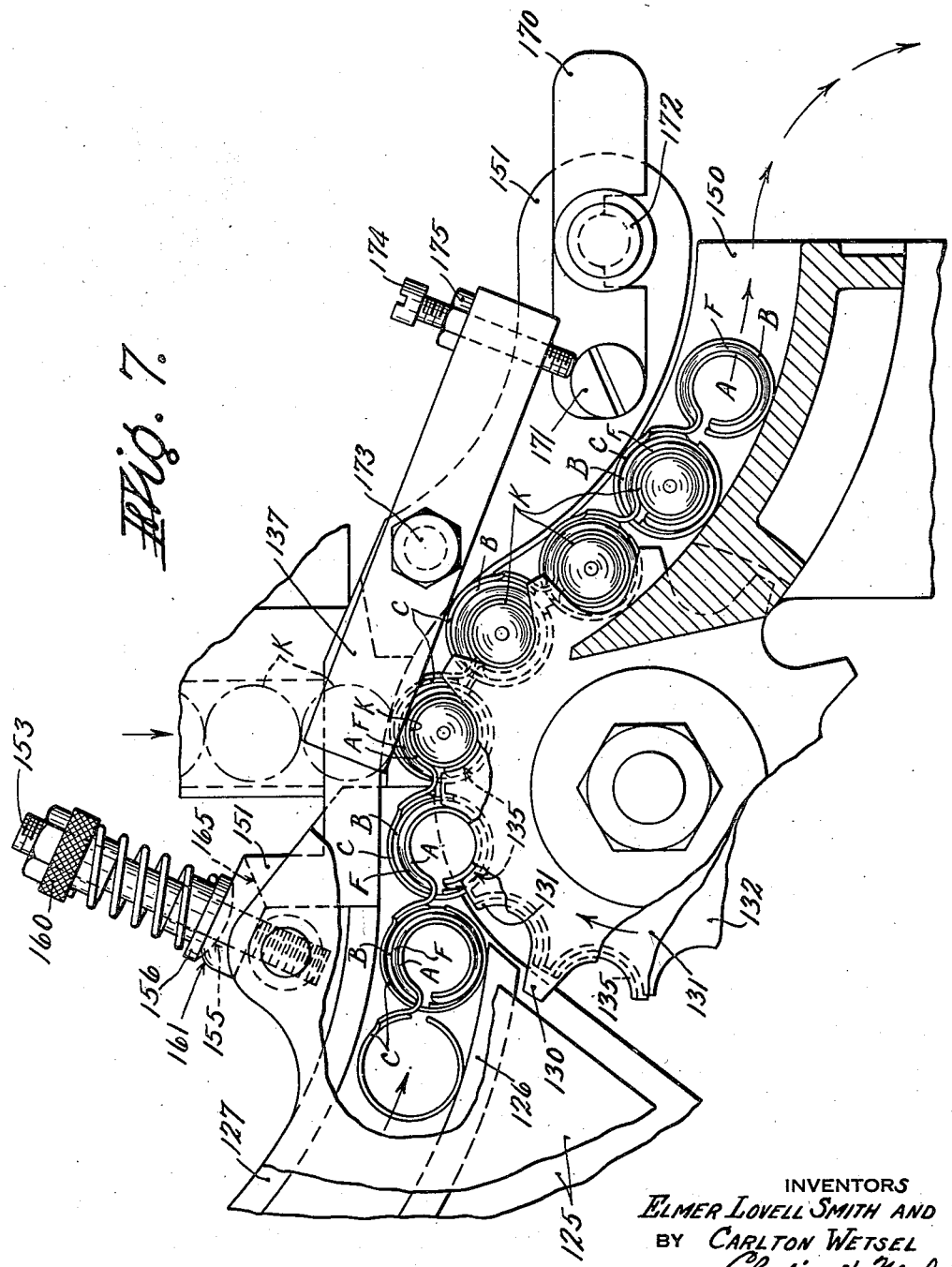

2,372,399

UNITED STATES PATENT OFFICE 2,372,399

LINK BELT CARTRIDGE LOADER

Elmer Lovell Smith, Longmeadow, and Carlton Wetsel, Springfield, Mass., assignors to Package Machinery Company, Springfield, Mass., a corporation of Massachusetts Application July 24, 1943, Serial No. 496,006

1 Claim. (Cl. 86—48)

This invention relates to a machine for loading cartridges into a carrying belt or chain for machine guns. The object of the invention is to provide a mechanism which will take separate chain links from a magazine, assemble them in chain form, and insert cartridges through their aligned pintle holes to act as pintles and serve as connectors to convert the separate links into a continuous chain. In the preferred form of the invention single links to make up said chain or belt are placed within a chute and fall by gravity to an assembly station where they are met by cartridges which have been placed in another chute simultaneously and have also fallen by their own weight to said assembly station. Said cartridges are pushed forward in timed relation with said links, which have been accurately spaced and aligned at said assembly station, for the entrance of said cartridges through said links, thus forming the pintles which, combined, make up the desired form of cartridge link-belt for use in machine guns or the like. This machine is unique in another manner in that it is comparatively small and of light weight and is provided with handles which enable it to be carried to any place where it is needed. Another feature is the provision made for using a hand crank for emergency operation of the machine should the source of power for normal operation fail or not be available at all. A more detailed description of the construction and operation of the machine will be found in the accompanying specification and claim in which, Fig. 1 is a front end view showing the relation of the link and cartridge chutes to the assembly station where the links and cartridges are assembled and moved out of the machine;

Fig. 2 is a right side view of Fig. 1 showing the cartridge chute broken away for clearness;

Fig. 3 is a view taken on line 3—3 of Fig. 2 illustrating the construction of the geneva and its driving crank;

Fig. 4 is a top plan of the machine with the link and cartridge chutes omitted for the purpose of showing the relation of the cartridge pusher to the assembly station;

Fig. 5 is an enlarged central longitudinal section through the cartridge pusher and assembly station;

Fig. 6 is a front end view of the cartridge pusher showing its construction and association with the cartridge chute, other parts of the assembly station being shown in dot-dash lines for clearness;

Fig. 7 shows the means of guiding the links and cartridges by the three sections of the assembly wheel, with certain parts broken away;

Fig. 8 shows two of a multiple of cartridges, after assembly by this machine, properly placed within the links of a long link-belt or chain; and Fig. 9 is a detail view of the release clutch for the overload release mechanism.

This machine has a comparatively small base 1 upon which is mounted the entire mechanism. Handles 2 are conveniently cast integral with said base at each end for ease in carrying the entire machine. A motor 3 drives the machine when power is available but means have been provided for operating the machine by the ordinary hand-wheel 5 shown on the drawings, should the power supply fail or not be available.

The motor 3 is provided with a standard make variable drive pulley 6 which drives a larger pulley 7 by a belt 8. Said driven pulley 7 is supported on one end of the main drive shaft 10 suitably mounted in bearings 11 and 12 contained in brackets 13 and 14 respectively, which are mounted on base 1. A bevel gear 16 on one end of said drive shaft 10 meshes with another bevel gear 17 mounted upon the end of a shaft 20 journaled in a bearing 21 integral with bracket 22 also mounted on base 1. At the front end of said shaft 20 is normally secured a hand wheel 5 as shown in Fig. 4, when the machine is power driven. By removing the hand wheel 5 and replacing it with a hand crank 4, Fig. 1, the drive shaft 10 can be hand driven through said bevel gearing in case of emergency. Pinned to continuously rotating shaft 10 is a pinion gear 25 constantly in mesh with a larger gear 26 loosely mounted upon a shaft 30. Shaft 30 is journaled in lowermost bearings in said brackets 13 and 14 respectively and also has keyed to it, between said brackets, a standard multiple disc clutch 33 for engaging said shaft 30 with continuously rotating gear 26, the hub of which contains the multiple discs of said clutch. By moving clutch lever 35 from disengaged full line position shown in Fig. 2 to its dotted line position, clutch 33 becomes engaged and drives shaft 30 which causes the machine to operate.

An overload release is mounted on the outer end of shaft 10. A driving ring 40 is secured to pulley 7 and has, engaged in a driving notch in said ring, a roll 41 mounted on the end of a bell crank 42. Bell crank 42 is carried by a driving member 43, Fig. 2, said member being pinned to the extreme end of shaft 10. A spring 44 on each side of bell crank 42 has one end secured to a pin extending from an ear 45 extending from each side of driving member 43 and the other end of said spring is attached to the lower end of bell crank 42. The tension of said spring keeps roll 41 in the driving notch in said ring 40 under normal operation of the machine. As clutch lever 35 is moved to its engaged position, as previously described, throw-out lever 50, being connected by a linkage 51 to said clutch lever 35, as shown in Figs. 2 and 4, respectively, and pivoted at 52 in brackets secured to base 1, is also moved to the dotted line position shown in Fig. 2, which places it comparatively close to the lower end of bell crank 42 (Fig. 2). Should anything happen during the normal operation of the machine to cause any part of the mechanism to jam or become inoperative, roll 41 will be cammed out of its driving notch in ring 40 and cause bell crank 42 to push lever 50 back to its full line position shown in Fig. 2, automatically disengaging said clutch 33 and stopping the machine so the operator can correct the trouble.

A bevel gear 55 secured to one end of driven shaft 30 (Figs. 2 and 4) drives another bevel gear 56 which is secured to a vertical shaft 57. Shaft 57 is journaled top and bottom in bearings extending from bracket 60 mounted on base 1. Above the uppermost bearing on said bracket 60, and at the top end of said shaft 57, is pinned a crank member 65. A link 66 extends from crank 65 to the pusher slide member 67 for oscillating said slide back and forth in ways 68 suitably secured to brackets 69 and 70 mounted on base 1 which accurately guide said pusher during its travel. The pusher pushes the cartridges from the hopper into the links to make up the desired link-belt or chain and reciprocates back and forth as long as the machine is in operation.

A jogger mechanism is located in the lower end of the link chute 75 as will be described below. Its purpose is to make certain that the links are nestled closely with each other when they arrive at the assembly station for being assembled with the cartridges. As they fall by gravity past said jogger they are rapidly but gently tapped on their edges so as to cause them to seek their proper interlocked position and be ready to receive their respective cartridges, as best shown in Fig. 7.

The links that make up the cartridge link-belt each consist of three loops or rings all of which are formed out of the same piece of metal as shown by the drawings. These links must be placed in the link chute 75 in a certain manner. Said links being placed into the chute in this manner may be noted as sliding down "feet first." In this phrase loops A and B constitute the feet, and loop C the head (Fig. 2). Loop A is the smallest of the three in diameter and has a flanged portion F against which the shoulder of the cartridge comes to rest when assembled. Loop B is axially in line with loop A and the cartridge shell fits snugly inside both loops A and B when it is in its proper place. Loop C is slightly larger than the cartridge shell and is located between and, at the same time, above loops A and B so that as the links fall down the link chute 75, it is necessary to have loops A and B of one link straddle loop C of the next; that that, when the cartridge is pushed into place as in Figs. 5 and 8, said loop C will connect the links together through the use of the cartridge as a pintle, as best shown in Fig. 8.

To make certain that the links will not be inserted in the link chute in a turned-over position with loop A on the opposite side of the chute, an obstruction consisting of two small blocks 78, as best seen in Figs. 1 and 2, is placed within the chute, one opposite the other, so that just the smallest portion of the link designated as A will be able to pass between them. Head portion C of the links must be placed at the top as they are deposited inside the chute.

To operate the aforesaid jogger mechanism for properly aligning and nesting the links while in the link chute, a cam 80 is attached to the under side of crank member 65 for continuous rotation. Agitating members 81 and 82 are supported on levers 83 and 84 respectively. Said levers are pivoted at 85 for oscillation by cam 80. A roll 86, carried on a bell crank 87 which is pivoted at 88, runs against said cam 80. A rod 89, secured to the other end of bell crank 87 is oscillated rapidly by the action of cam 80 on the roll 86, said roll being held against said cam by a spring 90 (Fig. 4) secured to bracket 70 at 91 and to an adjustable clamp 92 on said rod 89. Rod 89 is beveled on the end as at 93 so as to fit into a socket 95 on lever 84 (Fig. 2). Another spring 96, supported from a pin on link chute 75 is secured to an ear 97 on lever 83. Said lever 83, being pivoted at 85, is continually being urged by said spring 96 against a rubber washer 98 on a connecting rod 99 located between the two levers 83 and 84 respectively. Another rubber washer 100 bears against lever 84 which is pivoted at 85 and continually urges member 82 towards the center of the link chute while the lower end of said lever 84 upon which is mounted the socket 95 for receiving the beveled end of rod 89 is being continually urged toward the end of the said oscillating rod 89 by the spring 96, thus causing a quick and yieldable assembly between the jogger mechanism and the oscillating rod 89 that continually operates it while the machine is in operation.

The cartridges and the links arrive simultaneously at an assembly station where they are assembled into a so-called link-belt or chain. A pocket wheel, made up of three sections, receives the links and aligns them properly for the insertion through said links of the cartridges by the aforementioned oscillating pusher. Each forward stroke of the pusher pushes a cartridge through a pocket in the wheel and through a pair of properly aligned links. During the return stroke of said pusher, the pocket wheel assembly unit must be rotated so as to receive the next cartridge being pushed by the pusher on its next forward stroke. To accomplish this said pocket assembly wheel is rotated intermittently in timed relation with said pusher.

The three sections which comprise said pocket assembly wheel are referred to in general as 105. Said assembly 105 is keyed to its supporting and drive shaft 106, Figs. 2, 4 and 5. Said shaft 106 is suitably supported in bearings in brackets 70 and 13 respectively and is intermittently rotated by a well known Geneva mechanism. The segment 108 of said Geneva mechanism is mounted on the extreme end of shaft 106 with the pocket wheel assembly unit 105 mounted on the opposite end. Continuously rotating shaft 30 has the Geneva crank 110 pinned to it. Said crank carries a roll 112 which rotates in the direction of the arrow, Fig. 3, and said roll enters slots 114 in Geneva segment 108 and causes shaft 106 to be driven intermittently, in the direction of the arrow. Shaft 30 extends past the crank portion 110 and serves as a Geneva locking means, Figs. 2 and 3, while a cartridge is being pushed through the previously mentioned aligned links. Said shaft 30 is milled out at 115 to allow segment 108 to turn as soon as roll 112 enters another slot 114.

As previously stated, this machine consists of a cartridge chute 120 on one hand, and a link chute 75 on the other, referring particularly to Fig. 1. Said chutes merge at one central spot which is vertically in line with the delivery end of the cartridge chute and horizontally in line with the delivery end of the link chute respectively. This central spot is the assembly station where said links and cartridges are assembled into a link-belt or chain. A door 123 is provided in the delivery end of the cartridge chute for inspection or correction of any trouble occurring there.

The link chute consists of two side members 125 and a bottom member 126. Two openly spaced top members 127 confine said links to said chute during their downward travel. The cartridge chute (Fig. 1) consists of an open-top trough 128 which slants gently toward a vertical portion 129 which is directly above the pusher slide and where the cartridges are confined prior to their advance by the pusher into their proper position within said links.

Referring to Fig. 7, the links are shown approaching the assembly wheel, being guided by the same wheel, and after being assembled with cartridges, being delivered from the machine in the direction of the arrows. This view shows how the connecting loops C are axially in line with the cartridge supporting loops A and B as said loops are confined and guided by the teeth of the two outside sections 130 and 131 of the pocket wheel 105, and made ready to receive the cartridge. The inside section 132 of the pocket wheel supports and guides the B and C loops of the links and also the cartridges.

The outside of the flanged portion F of the loop A of each link rests inside and against the beveled portion 135 of the section 131. A hold-down member 137 has its lower and inner edge beveled correspondingly as at 138 to further guide said flanged portion of loop A and hold it down in perfect alignment while the cartridge is being pushed into its proper position by the pusher until the shoulder S of the cartridge rests firmly against the inside of the flanged portion of loop A of the link, as best shown in Fig. 5. Here the pusher is now ready to return and the cartridges K will fall one by one to the position shown by dot-dash lines and then be pushed within the loops of their respective links for assembly as before.

The end of the pusher has extended portions 140 on member 142 which confine the cartridge, by its flange, to a straight forward travel as it is pushed into the links. A cut-away portion 141 in the center, prevents the pusher from firing the cartridge. This same member 142 extends backward the full length of the cartridge (Fig. 5) and is slightly recessed at 143 for the cartridges to center themselves on during the pushers' forward and return stroke. This member 142 may be removed and replaced by a new one when it becomes worn. A stationary insert 145 is provided for the cartridges to fall onto in front of the oncoming pusher and is preferably made of some resilient material to prevent unnecessary damage to the cartridges or to the stationary insert when the cartridges fall into place.

Link-belt guide members are located above the completely assembled belt or chain as it moves out of the guides 150 which serve as the discharge channel. These guides are made up of one wide member 151 and two narrower pieces 152 all three of which are removable for inspection or maintenance of the discharge channel when necessary. The forward end of the main guide member 151 is slotted to straddle a pin 153 which is mounted on a cross rod 154 secured between the side members 125 of the link chute. A concave recess 155 in the end of member 151 is provided to receive a spring pressed convex button 156 which holds the entire guide members in their proper place as the two narrower members 152 are secured to the main piece 151 for removal as a unit. By grasping the knurled spring tension adjusting knob 160 and pulling it to the left as shown in Fig. 7, button 156 will be cammed over curved surface 161 while pin 153 moves through the slot 165 to release the upper end of said link-belt guide member. By raising latch member 170 which is pivoted at 171, the entire guide assembly may be quickly removed by pulling it off the stem 172. Link guiding member 137 is secured by a bolt 173 to the main guide member 151 and is therefore readily removed with the guide assembly.

Said member 137 is adjustable by set screw 174 and lock nut 175. Set screw 174 bears against the stationary pivot stud 171 and may be adjusted to obtain the necessary adjustment of member 137's beveled surface at the assembly station, as shown in Fig. 5, for the correct control of the flanged portion of loop A of the links to bear against, while the cartridge is being pushed through same by the pusher which actually requires a substantial push by said pusher to accomplish this.

The pusher stroke is fixed and therefore leaves the rim of the cartridge in a determined position (Fig. 5). In order to make sure that the shoulders of the cartridges rest firmly against the flanged portion F of the link-loop A, shims 178 are provided between the second and third sections 131 and 132 respectively of the assembly wheel 105 which may be removed or inserted to accomplish this result. Front section 130 of the assembly wheel guides the cartridges by their shell to align them centrally with the beveled surfaces of the links as they rest against hold-down member 137 and surfaces 135 of the assembly wheel section 131. An extreme outer guide member 180 is provided to further enclose the discharge channel and prevent the nose of the cartridges from becoming entangled in foreign objects while the machine is in operation.

Fig. 8 shows two of an unlimited number of cartridges which make up a link-belt or chain of this type to be used in a rapid firing gun, properly assembled with their respective links interlocking with each other as previously described while said cartridges actually form the necessary pintles for such a chain, as can be clearly seen from the drawings.

To maintain a high rate of production with this machine, the operator needs only to properly fill the link chute and the cartridge chute and keep them both filled and the necessary link-belt or chain will be produced rapidly. By operating this machine with the hand crank provided, instead of by power, a fairly high rate of production may be achieved also.

What we claim is:

Mechanism for assembling cartridges and links into a link belt wherein each link comprises a center loop and two straddle loops adapted for alignment with the center loop of an adjacent link, one of said straddle loops having a tapered flange for fitting the shoulder of a cartridge inserted through said aligned loops, said mechanism comprising in combination a moving carrier of several sections, each possessing a plurality of pockets therein, the corresponding pockets of each section being in alignment, the pockets of the first section each being shaped to receive the front end of a cartridge shell, the pockets of the second section each being beveled to receive and confine the tapered flange of a straddle loop of a link, and the pockets of the third section each being shaped to receive the other straddle loop of said link together with the center loop of an adjacent link, a stationary hold down member positioned above said beveled pocket section and having a corresponding beveled surface to engage the opposite side of a link loop in said section to coact therewith in serving as a stop for an inserted cartridge, said carrier being movable to present its pockets successively at an assembling station, and means for inserting cartridges successively through the loops of the links so positioned.

ELMER LOVELL SMITH.
CARLTON WETSEL.